US011420630B2

(12) United States Patent
Dax

(10) Patent No.: US 11,420,630 B2
(45) Date of Patent: Aug. 23, 2022

(54) TRAJECTORY MODIFICATIONS BASED ON A COLLISION ZONE

(71) Applicant: Zoox, Inc., Foster City, CA (US)

(72) Inventor: Victoria Magdalena Dax, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 279 days.

(21) Appl. No.: 16/663,161

(22) Filed: Oct. 24, 2019

(65) Prior Publication Data
US 2021/0122373 A1 Apr. 29, 2021

(51) Int. Cl.
*B60W 30/18* (2012.01)
*B60W 40/105* (2012.01)
*G05D 1/02* (2020.01)
*G05D 1/00* (2006.01)

(52) U.S. Cl.
CPC .... *B60W 30/18154* (2013.01); *B60W 40/105* (2013.01); *G05D 1/0088* (2013.01); *G05D 1/0223* (2013.01); *B60W 2554/80* (2020.02); *G05D 2201/0213* (2013.01)

(58) Field of Classification Search
CPC ......... B60W 30/18154; B60W 40/105; B60W 2554/80; B60W 60/0011; B60W 60/00274; B60W 30/18159; B60W 30/09; B60W 30/0956; B60W 30/0953; G05D 1/0088; G05D 1/0223; G05D 2201/0213; G08G 1/166
See application file for complete search history.

(56) References Cited

U.S. PATENT DOCUMENTS

| | | | |
|---|---|---|---|
| 9,026,300 B2 | 5/2015 | Ferguson | |
| 9,528,838 B2 | 12/2016 | Okumura | |
| 9,718,466 B2 | 8/2017 | Kim et al. | |
| 10,019,011 B1 | 7/2018 | Green et al. | |
| 10,037,036 B2* | 7/2018 | Nilsson | B60W 30/143 |
| 10,268,200 B2 | 4/2019 | Fang et al. | |

(Continued)

FOREIGN PATENT DOCUMENTS

WO WO2019152888 A1 8/2019

OTHER PUBLICATIONS

The PCT Search Report and Written Opinion dated Jan. 28, 2021 for PCT application No. PCT/US20/56614, 8 pages.

(Continued)

*Primary Examiner* — Brian P Sweeney
(74) *Attorney, Agent, or Firm* — Lee & Hayes, P.C.

(57) ABSTRACT

The described techniques relate to modifying a trajectory of a vehicle, such as an autonomous vehicle, based on an overlap area associated with an object in the environment. In examples, map data may be used, in part, to generate an initial trajectory for an autonomous vehicle to follow through an environment. In some cases, a yield trajectory may be generated based on detection of the object, and the autonomous vehicle may evaluate a cost function to determine whether to execute the yield or follow the initial trajectory. In a similar manner, the autonomous vehicle may determine a merge location of two lanes of a junction, and use the merge location to update extents of an overlap area to prevent the autonomous vehicle from blocking the junction and/or provide sufficient space to yield to the oncoming vehicle while merging.

20 Claims, 8 Drawing Sheets

(56) References Cited

U.S. PATENT DOCUMENTS

| | | |
|---|---|---|
| 10,394,245 B2 | 8/2019 | Li et al. |
| 10,640,111 B1 | 5/2020 | Gutmann et al. |
| 10,906,558 B1 | 2/2021 | Hwang et al. |
| 10,928,820 B1 | 2/2021 | Tao et al. |
| 10,990,096 B2 | 4/2021 | Isele et al. |
| 11,021,148 B2 | 6/2021 | Ghafarianzadeh et al. |
| 11,077,850 B2 | 8/2021 | Green et al. |
| 11,225,247 B2 | 1/2022 | Beller et al. |
| 2013/0268162 A1 | 10/2013 | Ponziani |
| 2015/0307093 A1 | 10/2015 | Sasabuchi |
| 2016/0335892 A1 | 11/2016 | Okada et al. |
| 2017/0372612 A1 | 12/2017 | Bai et al. |
| 2018/0095103 A1 | 4/2018 | Hirai et al. |
| 2018/0239361 A1 | 8/2018 | Micks et al. |
| 2019/0049970 A1 | 2/2019 | Djuric et al. |
| 2019/0179002 A1 | 6/2019 | Takayama |
| 2019/0317499 A1 | 10/2019 | Imai et al. |
| 2019/0332110 A1 | 10/2019 | Isele et al. |
| 2019/0333381 A1 | 10/2019 | Shalev-Shwartz et al. |
| 2019/0367022 A1 | 12/2019 | Zhao et al. |
| 2019/0369626 A1 | 12/2019 | Lui et al. |
| 2020/0276988 A1 | 9/2020 | Graves |
| 2020/0307563 A1 | 10/2020 | Ghafarianzadeh et al. |
| 2020/0339116 A1 | 10/2020 | Xu et al. |
| 2020/0346662 A1 | 11/2020 | Suzuki et al. |
| 2021/0020045 A1 | 1/2021 | Huang |
| 2021/0053570 A1 | 2/2021 | Akella et al. |
| 2021/0055733 A1 | 2/2021 | Beller et al. |
| 2021/0061269 A1 | 3/2021 | Petroff et al. |
| 2021/0070325 A1 | 3/2021 | Isele |
| 2021/0094577 A1 | 4/2021 | Shalev-Shwartz et al. |
| 2021/0114617 A1 | 4/2021 | Phillips et al. |
| 2021/0139048 A1 | 5/2021 | Russell et al. |
| 2021/0146922 A1 | 5/2021 | Fuchs |
| 2021/0188317 A1 | 6/2021 | Xia et al. |
| 2021/0229656 A1 | 7/2021 | Dax |
| 2021/0276577 A1 | 9/2021 | Adams et al. |
| 2021/0304608 A1 | 9/2021 | Clark et al. |
| 2021/0370921 A1 | 12/2021 | Silva et al. |
| 2021/0406560 A1 | 12/2021 | Park et al. |

OTHER PUBLICATIONS

Office Action for U.S. Appl. No. 16/663,185, dated Feb. 3, 2022, Dax, "Trajectory Modifications Based On a Collision Zone", 31 pages.

International Preliminary Report on Patentability for PCT Application No. PCT/US20/56614, dated May 5, 2022.

\* cited by examiner

TRAJECTORY MODIFICATIONS BASED ON A COLLISION ZONE

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects, such as to avoid collisions with objects in the surrounding environment. A variety of sensors may be used to collect information about objects in the surrounding environment, which may be used by the autonomous vehicle to make decisions on how to traverse the environment. Determining trajectories for the autonomous vehicle to follow to prevent collisions without inhibiting traffic flow may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
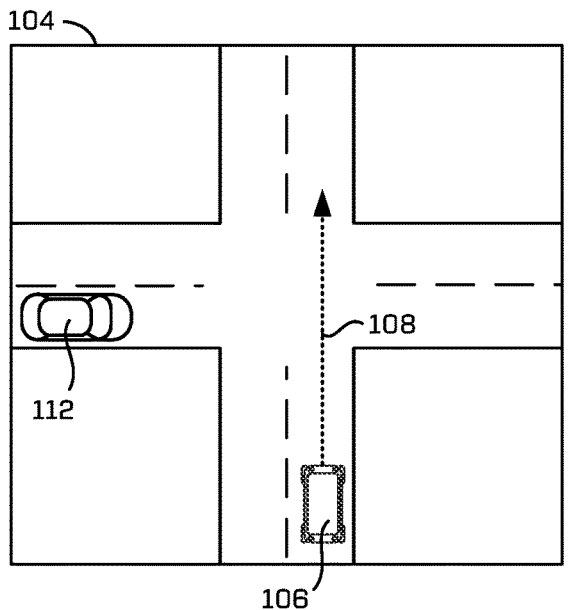
FIG. 1 is a pictorial flow diagram of determining a collision zone based on a trajectory for an autonomous vehicle and one or more predicted trajectories for an object, updating the trajectory based on the predicted object trajectories, and controlling the autonomous vehicle based on the updated trajectory, in accordance with examples of the disclosure.
Figure 1:
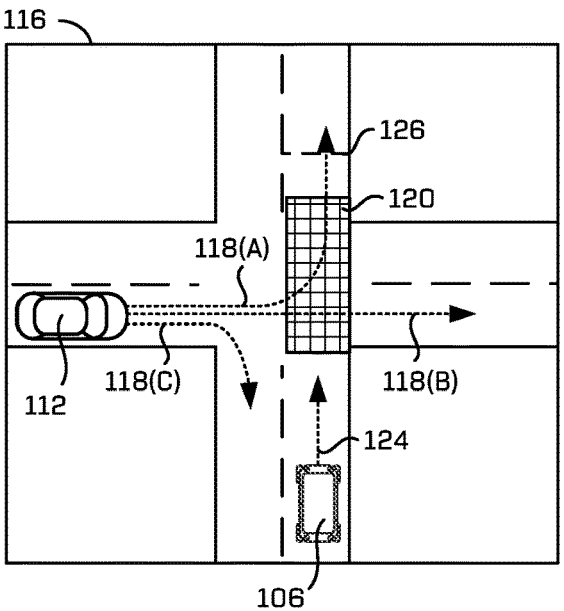

This disclosure relates to modifying a trajectory of a vehicle, such as an autonomous vehicle, based on a collision zone associated with an object in the environment. In examples, map data may be used, in part, to generate an initial trajectory for an autonomous vehicle to follow through an environment. The autonomous vehicle may capture sensor data (e.g., lidar, radar, time of flight, and the like) as the autonomous vehicle proceeds through the environment, and may use the sensor data to generate predictions of object behavior. In some examples, the autonomous vehicle may utilize a variety of sensor modalities and algorithms to predict behaviors of objects in an environment surrounding the autonomous vehicle. Predicted behaviors of objects can then be used to generate and refine the autonomous vehicle's trajectory (and/or select an alternate trajectory) as the autonomous vehicle proceeds through the environment. Some examples of generating and/or refining an autonomous vehicle's trajectory may include determining a speed to proceed through the environment, determining when and/or how fast to stop, determining a lane for the autonomous vehicle to use to proceed through the environment, determining whether to yield to an oncoming vehicle, speed up, an amount of space to leave when yielding, and so forth.

In some examples, sensor data captured by sensors of the autonomous vehicle may be used to determine a collision zone associated with the autonomous vehicle and one or more objects detected in the environment. A collision zone corresponds to an area of the environment where a collision between the autonomous vehicle and the object may occur, based on current trajectories (and/or variances, accelerations, decelerations, etc. associated with the current trajectories) of the autonomous vehicle and the object. For instance, a collision safety component of the autonomous vehicle may determine a time-space overlap associated with the autonomous vehicle, the object, and an area of the environment. The time-space overlap may be based on locations of entry and exit points of the autonomous vehicle and the object respective to an overlap area of the trajectories of the autonomous vehicle and the object. Additionally, in some cases, the time-space overlap may be based on predicted times for the autonomous vehicle and the object to reach the entry and exit points, which may take into account factors such as current tracked speed, minimum distance to stop, maximum acceleration, and the like. Additional details regarding collision zones can be found in U.S. patent application Ser. No. 16/136,038, which is incorporated by reference herein in its entirety. Such entry and exit times may be based on, for example, conservative and aggressive estimates for an object given the object classification (vehicle, pedestrian, bicyclist, etc.) and/or based on a predicted trajectory of the object (e.g., as may be determined by a top-down estimation) plus and minus some buffer (which, in some examples, may be based on a probabilistic distribution associated with the trajectory prediction). Additional details regarding top-down predictions based on image features can be found in U.S. patent application Ser. No. 16/586,620, which is incorporated by reference herein in its entirety.

For a vehicle (e.g., an autonomous vehicle or an autonomous robot) to drive safely through an environment, it may make predictions about the behavior of other objects in the world. For instance, the autonomous vehicle can pass through the environment safely if it can accurately determine whether to yield to an oncoming object or not. The autonomous vehicle may use the collision zone to determine whether to yield to the object. However, in some cases, yielding to the object may cause the autonomous vehicle to block the trajectory of the object, resulting in stopped or slowed traffic, and/or less safe outcomes. Therefore, the described techniques account for yield behavior by the autonomous vehicle when determining a trajectory for the autonomous vehicle to follow relative to a collision zone involving an object.

For instance, the autonomous vehicle may receive and/or generate a first trajectory to follow through the environment, such as to proceed through a junction. The autonomous vehicle may determine a second trajectory for an object in the environment involving a prediction of a path that the object will follow. For instance, the second trajectory may predict that the object will cross through the junction in a lane intersecting with the path of the autonomous vehicle's first trajectory. In some examples, the autonomous vehicle may determine a yield trajectory to yield to the object, such as by slowing down or stopping to allow the object to pass. The autonomous vehicle may then determine whether to continue following the first trajectory or execute the yield trajectory. For instance, the autonomous vehicle may determine an overlap area in the environment based on a first area associated with the autonomous vehicle following the first trajectory (e.g., an area of the size of the vehicle following the trajectory), and a second area associated with the object following the second trajectory (e.g., an area of the size of the object following the trajectory). In some cases, the overlap area may correspond, at least in part, to a collision zone between the autonomous vehicle and the object, as described above and in more detail below. The autonomous vehicle may determine a cost associated with performing the yield, and/or associated with proceeding along the first trajectory. The cost may be based on the overlap area, and a time-space overlap accounting for potential collisions for both scenarios (the yield trajectory and the first trajectory). In some examples, the time-space overlap may be based on predicted trajectories of the autonomous vehicle and/or the object, and accounting for any predicted differences or errors from the predicted trajectories. Based on the cost, the autonomous vehicle may proceed along the first trajectory, may execute the yield trajectory, or may select an alternate trajectory to follow.

In some cases, the autonomous vehicle may merge into a lane occupied by another object, such as merging onto a highway or turning at a junction. Previous techniques relied upon map data to set extents of a collision zone that extended past the junction. Oftentimes, the extents of the junction in map data would extend a significant distance (e.g., 10 or more meters) past a stop line, crosswalk, sidewalk, or other landmark. The collision zone in these previous techniques would require that the object in the lane would exit the collision zone associated with the junction extents before the autonomous vehicle entered the to-be-shared lane. Thus, previous techniques often caused the autonomous vehicle to block traffic in the intersection while superfluous space was present in front of the autonomous vehicle and behind the object and/or otherwise cause the vehicle to perform much more conservative maneuvers (which, in some examples, would cause the vehicle to be precluded from executing any maneuver (e.g., due to spatial constraints, blocking an intersection, and the like).

Therefore, the described techniques may modify a collision zone and/or utilize a collision zone in a different way in order to prevent the autonomous vehicle from colliding with the object, while also preventing the autonomous vehicle from impeding traffic in the junction. In some examples, the autonomous vehicle may determine a junction in the environment, where the junction includes a first lane where the autonomous vehicle is currently located and a second lane into which the autonomous vehicle plans to merge. The autonomous vehicle may detect an object in the second lane, such as an object that the autonomous vehicle will follow as the autonomous vehicle merges into the second lane.

The autonomous vehicle may determine a collision zone associated with the autonomous vehicle and the object as the autonomous vehicle merges into the second lane with the object. For instance, the autonomous vehicle may determine a merge location where a first path beginning in the first lane transitioning to the second lane merges with a path that follows the second lane. In other words, the first path may correspond to the trajectory of the autonomous vehicle from the first lane into the second lane, and the second path may correspond to the trajectory of the object staying in the second lane. The collision safety component of the autonomous vehicle may determine an exit point for the collision zone based on the merge location of the paths of the two lanes. In some cases, the exit point may be based on the merge location with a safety distance added, where the safety distance may be based on a detected size of the specific object and/or a predetermined size (e.g., an average vehicle size, a maximum vehicle size, etc.). In many cases, the exit point will reduce a size of the collision zone from a size determined based on the extents of the junction as included in map data, thus reducing the superfluous space between the autonomous vehicle and the object as the autonomous vehicle merges into the lane. Additionally, the safety distance added to the merge location prevents the autonomous vehicle from colliding with the object during the merge.

The techniques discussed herein can improve a functioning of a computing device in a number of ways. As discussed above, the collision safety component may utilize a cost function to determine whether to yield to a vehicle, or proceed along a trajectory without yielding (and/or otherwise adjust a velocity/acceleration of the vehicle to perform a safe maneuver). The cost function can enable the autonomous vehicle to make decisions on how to proceed through the environment earlier and with greater confidence. Additionally, the collision safety component can provide a more confident trajectory during a merge that prevents the autonomous vehicle from blocking a junction. Consequently, significantly less processing resources are used in comparison to conventional techniques that continue to evaluate multiple trajectories for the autonomous vehicle and/or the object while proceeding uncertainly through the environment, or getting stuck in the middle of a junction. In some cases, the described techniques are more accurate than other collision prevention mechanisms, thus improving safety of the autonomous vehicle and surrounding persons and/or vehicles. For instance, relying on junction extents to determine a collision zone during a merge in conventional systems created an overly-conservative space between the autonomous vehicle and an object that the autonomous vehicle was merging behind, while causing the autonomous vehicle to block traffic inside of the junction. Conventional techniques that generated collision zones based on sensor data and map data often prioritized yielding to an object over blocking traffic, which may also cause safety concerns. However, the described techniques account for blocking traffic if the autonomous vehicle chooses to yield, thus conserving resources that would otherwise be devoted to safely exiting a junction blocked by the autonomous vehicle that likely would leave objects in the environment in undesired positions (e.g., stuck in a middle of the junction as a traffic light changes from green to red). Accordingly, controlling the vehicle based in part on trajectory modifications based on collision zones can reduce processing resources, by allowing the autonomous vehicle to proceed through the environment more efficiently. By controlling the vehicle based in part on trajectory modifications based on collision zones, the safety of the autonomous vehicle can be improved by making trajectory decisions faster and earlier. Further, techniques for controlling the vehicle based in part on trajectory modifications based on collision zones can increase a confidence that the vehicle can avoid collisions with oncoming traffic and/or pedestrians by determining the behaviors earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram 100 of determining a collision zone based on a trajectory for an autonomous vehicle and one or more predicted trajectories for an object, updating the trajectory based on the predicted object trajectories, and controlling the autonomous vehicle based on the updated trajectory, in accordance with examples of the disclosure.

An operation 102 includes receiving a trajectory for a vehicle to follow to traverse an environment. In some examples, the trajectory may be generated by an autonomous vehicle as the autonomous vehicle traverses the environment. Alternatively or additionally, the trajectory may be generated by a remote computing device and delivered to a vehicle to follow through an environment. The trajectory may be generated based on map data, data received from sensors of the vehicle (e.g., lidar sensors, radar sensors, cameras, time of flight sensors, and the like), or a combination of map data and sensor data.

For instance, an example 104 illustrates an environment in which an autonomous vehicle 106 is traversing the environment. In some examples, the autonomous vehicle 106 can perform the operations of the pictorial flow diagram 100, which can include receiving a trajectory 108 to follow through the environment, where the trajectory may be based at least in part on sensor data. For the purpose of discussion, a vehicle capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure. In the example 104, the trajectory 108 instructs the autonomous vehicle 106 to proceed in a current lane through a junction in the environment. In some examples, the trajectory 108 may include instructions on a speed for the autonomous vehicle 106 to proceed through the environment, lane position for the autonomous vehicle 106 to occupy, acceleration/deceleration instructions, and the like.

An operation 110 includes detecting, from sensor data, an object in the environment. For example, the sensor data can include data captured by one or more of a lidar sensor, a radar sensor, an image sensor, a time of flight sensor, a sonar sensor, and the like. In at least some examples, additional environmental data may be received (e.g., map data of the environment encoding portions such as lanes, reference lines, crosswalks, traffic devices and/or signs, and the like). Reference will generally be made to the object being a vehicle in the environment, but any object in the environment is considered without departing from the scope of this disclosure (e.g., pedestrian, motorcycle, bicycle, animal, train, and so forth). For instance, returning to the example 104, the autonomous vehicle 106 may detect an object 112 in the environment. In the example 104, the object 112 is approaching the junction in a lane intersecting the lane occupied by the autonomous vehicle 106.

An operation 114 includes determining a collision zone based at least in part on the trajectory for the vehicle and one or more predicted trajectories of the object. As discussed above and in more detail below, a collision zone corresponds to an area of the environment where a collision between the autonomous vehicle 106 and the object 112 may occur, based on current trajectories (and/or variances, accelerations, decelerations, etc. associated with the current trajectories) of the autonomous vehicle 106 and the object 112. For instance, the autonomous vehicle 106 may determine a time-space overlap associated with the autonomous vehicle 106, the object 112, and an area of the environment (in this case, the junction where the lanes intersect). The time-space overlap may be based on locations of entry and exit points of the autonomous vehicle 106 and the object 112 respective to an overlap area of the trajectories of the autonomous vehicle 106 and the object 112. Additionally, in some cases, the time-space overlap may be based on predicted times for the autonomous vehicle 106 and the object 112 to reach the entry and exit points, which may take into account factors such as current tracked speed, minimum distance to stop, maximum acceleration, and the like. Additional details regarding collision zones can be found in U.S. patent application Ser. No. 16/136,038, which is incorporated by reference herein in its entirety. In some examples, the autonomous vehicle 106 may generate a top-down representation of the environment that includes one or more Gaussian (or other type of) distributions of probabilities for entry and exit points of the collision zone for the autonomous vehicle 106 and/or the object 112. Additional details regarding trajectory prediction for top-down scenes can be found in U.S. patent application Ser. No. 16/151,607, which is incorporated by reference herein in its entirety.

For instance, an example 116 illustrates the autonomous vehicle 106 and the object 112 in the environment, generally as depicted in the example 104. However, the example 116 also depicts a predicted trajectory 118(A), a predicted trajectory 118(B), and a predicted trajectory 118(C) (collectively, "predicted trajectories 118"). In some examples, the autonomous vehicle 106 may generate the predicted trajectories 118 based on possible paths that the object 112 may follow through the environment, e.g., based on map data, other objects in the environment, a trajectory of the autonomous vehicle 106, detected conditions associated with the object 112 (e.g., a blinker light indicating a turn, a wheel direction indicating a turn or not, brake lights, etc.) or a combination of two or more of these. In this case, the predicted trajectory 118(A) corresponds to the object 112 making a left-hand turn into the same lane as the autonomous vehicle 106, the predicted trajectory 118(B) corresponds to the object 112 continuing straight through the junction in the same lane, and the predicted trajectory 118(C) corresponds to the object 112 making a right-hand turn to proceed in an opposite direction to the autonomous vehicle 106 in the lane adjacent the autonomous vehicle 106.

Additionally, the example 116 illustrates a collision zone 120, which may be generated by the autonomous vehicle 106 in response to determining the predicted trajectories 118 of the object 112. In some examples, the collision zone 120 may be based, in part, on a path polygon associated with the autonomous vehicle 106 as the autonomous vehicle 106 follows the trajectory 108. The autonomous vehicle 106 may determine a path polygon based on a center of the autonomous vehicle 106 (e.g., an estimated center of mass, an estimated volumetric center point of the agent, or the like) following the trajectory 108, along with dimensions added to the center of the autonomous vehicle 106 along the trajectory 108 based on a size of the autonomous vehicle 106, and in some cases, a safety envelope surrounding the size of the autonomous vehicle 106. The safety envelope may be of a size to prevent a collision between the autonomous vehicle 106 and the object 112. The collision zone 120 may include an area of the environment in which the path polygon of the autonomous vehicle 106 and one or more of the trajectories 118 of the object 112 intersect.

In some examples, the autonomous vehicle 106 may determine a likelihood that each of the predicted trajectories 118 will be carried out by the object 112. For instance, if the object 112 has a left blinker on as the object 112 approaches the junction, the autonomous vehicle 106 may determine that the predicted trajectory 118(A) has a higher likelihood than the predicted trajectory 118(B) and/or the predicted trajectory 118(C). The autonomous vehicle 106 may compare the respective predicted trajectory likelihoods to a trajectory likelihood threshold, such as greater than 50% likelihood, greater than 90% likelihood, greater than 99% likelihood, and so forth. If one or more of the predicted trajectories 118 are above the trajectory threshold likelihood, such predicted trajectories may be selected to determine one or more collision zones. In some examples, if more than one of the predicted trajectories 118 is greater than the trajectory threshold likelihood, the autonomous vehicle 106 may select a most conservative of the predicted trajectories 118 (and in some cases, a variance associated with the most conservative of the predicted trajectories) that are greater than the trajectory threshold likelihood to determine the collision zone 120. Additional details regarding generation and selection of predicted trajectories can be found in U.S. patent application Ser. No. 16/160,493, U.S. patent application Ser. No. 16/420,050, and U.S. patent application Ser. No. 16/151,607, which are incorporated by reference herein in their entirety.

An operation 122 includes updating the trajectory based at least in part on the collision zone. For instance, the autonomous vehicle 106 may determine that a yield action may reduce a likelihood of a collision with the object 112 if the object 112 follows the predicted trajectory 118(B). In some examples, the autonomous vehicle 106 may determine a cost (e.g., by evaluating a cost function) to determine whether to continue along the trajectory 108 or to perform the yield. For example, in some cases, performing the yield may cause the autonomous vehicle 106 to stop within the collision zone 120 (or in some other portion of the junction), blocking the flow of traffic of the object 112 and/or other objects in the environment. Therefore, the cost function may take into account a stop position of the autonomous vehicle 106 to perform the yield relative to the trajectory 118(B). Additionally, in some cases, the autonomous vehicle 106 may determine, as part of the cost of performing the yield, how far the autonomous vehicle 106 has proceeded into the junction. In the example 116, the autonomous vehicle 106 has determined, based on a cost of following the trajectory 108 versus performing a yield to the object 112, that performing the yield has a lower cost than following the trajectory 108. Therefore, the autonomous vehicle 106 has generated an updated trajectory 124 which instructs the autonomous vehicle 106 to slow down to yield to the object 112 as the object follows the predicted trajectory 118(B).

In some examples, the updated trajectory may be based on the autonomous vehicle 106 merging into a lane with the object 112. Consider an example in which the object 112 follows the predicted trajectory 118(A), and the autonomous vehicle 106 follows the object 112 in the lane that the object 112 turns. In conventional scenarios, the autonomous vehicle 106 would rely upon an extent 126 of the junction received in map data to determine an exit point of the collision zone. However, in the described techniques, the autonomous vehicle 106 may determine a size of the collision zone 120 based on a merge location associated with the merging lanes (and in some examples, a safety distance added to the merge location), thus reducing a size of the collision zone 120. By reducing a size of the collision zone 120, the autonomous vehicle 106 may update the trajectory by proceeding farther through the junction when merging behind the object 112, reducing unnecessary space behind the object 112 in the merged lane, and reducing the chance of the autonomous vehicle 106 blocking traffic in the junction while following the object 112 after the merge.

Accordingly, an operation 128 includes controlling the vehicle based at least in part on the updated trajectory. For instance, controlling the vehicle may include controlling the autonomous vehicle 106 to yield according to the updated trajectory 124, or continue to follow the trajectory 108, based on the costs associated with the respective actions. In some examples, controlling the vehicle may include controlling the autonomous vehicle 106 to merge with the object 112 with less space than would be required if the autonomous vehicle 106 relied upon the junction extents to determine the collision zone 120. Other examples are also considered, and are explored in more detail below in relation to the following figures.

Figure 2:
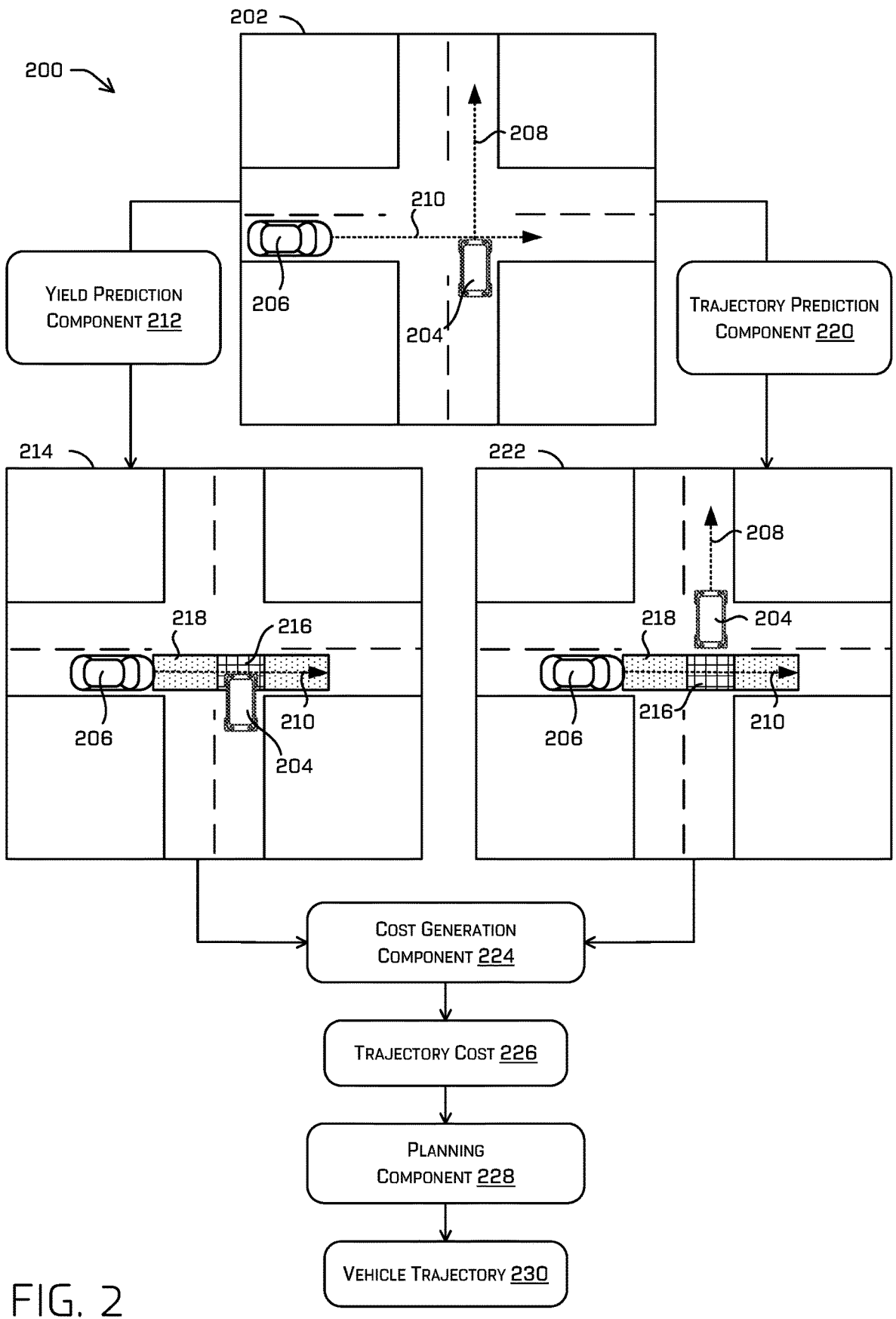
FIG. 2 is an illustration of generating a yield trajectory and a non-yield trajectory, determining a cost for the respective trajectories, and selecting a trajectory based on the cost, in accordance with examples of the disclosure.

FIG. 2 is an illustration 200 of generating a yield trajectory and a non-yield trajectory, determining a cost for the respective trajectories, and selecting a trajectory based on the cost, in accordance with examples of the disclosure.

An example 202 depicts an autonomous vehicle 204 and an object 206 in an environment, in this case, proximate a junction of intersecting lanes. In this example, the autonomous vehicle 204 is following a trajectory 208 to proceed through the junction. The autonomous vehicle 204 may detect the object 206 as described above in relation to FIG.

1, and predict a trajectory 210 that the object 206 will follow to proceed through the junction as well. The autonomous vehicle 204 may capture sensor data of the environment and utilize map data of the environment to generate the trajectory 208 and to predict the trajectory 210 of the object 206. In some examples, the autonomous vehicle 204 may determine that a collision is possible between the autonomous vehicle 204 and the object 206 based on the trajectories 208 and 210, and in some cases, potential variances of the trajectories 208 and 210. Because of the potential chance of a collision, the autonomous vehicle 204 may determine that a yield action should be evaluated, which would cause the autonomous vehicle 204 to slow down or stop and let the object 206 pass in front of the autonomous vehicle 204 through the junction.

For instance, the trajectory 208 and the trajectory 210 (and any other relevant information from the sensor data and/or the map data) may be input into a yield prediction component 212. The yield prediction component 212 may generate a yield trajectory for the autonomous vehicle 204 to cause the autonomous vehicle to stop and/or slow down and allow the object 206 to pass in front of the autonomous vehicle 204 in the junction. To do so, the yield prediction component 212 may determine a collision zone based on an overlap area of the trajectory 210 of the object 206, and the yield trajectory for the autonomous vehicle 204.

An example 214 illustrates an overlap area 216 determined by the yield prediction component 212. The yield prediction component 212 may use the overlap area 216 to determine a collision zone associated with the yield trajectory and the trajectory 210 of the object 206. For instance, the overlap area 216 may be based in part on an area 218 according to a size of the object 206 as the object follows the trajectory 210. The overlap area 216 may also be based on a size of the autonomous vehicle 204 following a trajectory (e.g., the trajectory 208) through the area 218.

In some examples, the yield prediction component 212 may use dimensions and/or extents of the overlap area 216 to determine a space overlap component of a time-space overlap associated with the trajectories of the autonomous vehicle 204 and the object 206. For instance, the space overlap may be based on an entry point of the autonomous vehicle 204 entering the overlap area 216, an entry point of the object 206 entering the overlap area 216, an exit point of the autonomous vehicle 204 exiting the overlap area 216, and an exit point for the object 206 exiting the overlap area 216. Additionally, the yield prediction component 212 may determine a time overlap component of the time-space overlap associated with the trajectories of the autonomous vehicle 204 and the object 206. For example, the time overlap component may be based on predicted times for the autonomous vehicle 204 to reach the corresponding entry and exit points, and predicted times for the object 206 to reach the corresponding entry and exit points. The yield prediction component 212 may determine the entry and exit times for the object 206 based on the autonomous vehicle 204 determining an object type of the object 206 (e.g., car, bicycle, pedestrian, semi-truck, etc.), a current speed of the object 206, a junction type of the junction where the overlap area 216 is located (e.g., stop light, 4-way intersection, 3-way intersection, uncontrolled intersection, highway merge, etc.), a speed limit proximate the junction, a predicted rate of acceleration and/or deceleration of the object 206, and the like. Additionally, the yield prediction component 212 may determine the entry and exit times for the object 206 based on probability distributions for the predicted trajectories, to determine minimum and/or maximum entry and exit times for the autonomous vehicle 204 and/or the object 206. The yield prediction component 212 may also take into account predicted accelerations and/or decelerations of the autonomous vehicle 204 and/or the object 206 when determining the entry and exit times as well.

In examples, the trajectory 208 and the trajectory 210 (and any other relevant information from the sensor data and/or the map data) may be input into a trajectory prediction component 220 as well. The trajectory prediction component 220 may generate a trajectory for the autonomous vehicle 204 to follow to proceed through the environment substantially simultaneously with the yield prediction component 212, as an alternative trajectory to the autonomous vehicle 204 yielding to the object 206. For instance, the trajectory prediction component 220 may evaluate predictions based on the autonomous vehicle 204 continuing to follow the trajectory 208, and/or may alter the trajectory 208 by accelerating, decelerating, turning, changing a position within a lane or to a different lane, and so forth. The trajectory prediction component 220 may determine an alternate trajectory for the autonomous vehicle 204 to follow based on the collision zone and overlap area of the trajectory 210 of the object 206, and (in this example) the trajectory 208 for the autonomous vehicle 204.

An example 222 illustrates the overlap area 216, which may be determined by the yield prediction component 212 and/or determined by the trajectory prediction component 220 in a similar manner as described above. The trajectory prediction component 220 may also use the overlap area 216 to determine a collision zone, associated with the autonomous vehicle 204 following the trajectory 208 in this case. Similar to the discussion above, the overlap area 216 may be based in part on the area 218 according to a size of the object 206 as the object follows the trajectory 210. The overlap area 216 may also be based on a size of the autonomous vehicle 204 following the trajectory 208 through the area 218. Additionally, in examples, the trajectory prediction component 220 may determine a time-space overlap having a space overlap component and a time overlap component as discussed above.

A cost generation component 224 may receive information associated with the overlap area 216 and/or the time-space overlaps described above, and generate a trajectory cost 226 corresponding to whether the autonomous vehicle 204 should yield to the object 206 or proceed along the trajectory 208. In some examples, the cost generation component 224 may use a cost function to generate the trajectory cost 226, such as according to the following:

$$\left(1 - \frac{V_{ExitT} - E_{EnterT}}{V_{ExitT} - V_{EnterT}}\right) * W_t + \frac{\max(-V_{EnterDistance}, 0.0)}{V_{CollisionZoneLength}} * W_d >$$

$$costThreshold, \forall \text{ collisions detected}$$

Where $V_{ExitT}$ corresponds to a time that the autonomous vehicle 204 exits the collision zone, $E_{EnterT}$ corresponds to a time that the object 206 enters the collision zone, $V_{EnterT}$ corresponds to a time that the autonomous vehicle 204 enters the collision zone, $W_t$ is a weight applied to the time overlap component, $V_{EnterDistance}$ corresponds to a minimum stopping distance that the autonomous vehicle 204 can achieve in the junction to perform the yield (which may depend upon how far into the junction the autonomous vehicle 204 has progressed into the junction), $V_{CollisionZoneLength}$ corresponds to a length of the collision zone, and $W_d$ is a weight applied to the distance overlap component. The first term is associated with the time overlap component of the time-space overlap, and evaluates a breadth of the time-space overlap. Additional details regarding the time overlap component of the time-space overlap can be found in relation to the discussion of FIG. 3A.

The second term is associated with the distance overlap component, and evaluates a distance that the autonomous vehicle 204 has proceeded into the junction proportionate to the entire length of the collision zone. This term determines whether the autonomous vehicle 204 has proceeded far enough into the junction to already be blocking the path of the object 206, and if so, may be used by a planning component 228 to cause the autonomous vehicle 204 to continue along the trajectory 208 (and/or to accelerate to exit the junction faster, for instance).

In some cases, the object 206 may be predicted to enter the collision zone shortly after the autonomous vehicle 204, where a collision may be imminent. In this case, the trajectory prediction component 220 may prevent the yield prediction component from evaluating the yield trajectory, and thus prevent the cost generation component 224 from evaluating a cost associated with the yield trajectory. Similarly, if the object 206 enters the collision zone before the autonomous vehicle 204, the autonomous vehicle 204 should yield to the object 206, and thus computation of the yield trajectory cost may be prevented. In such cases, processing resources may be conserved by trimming the yield trajectory analysis when the yield trajectory analysis is not necessary (e.g., the autonomous vehicle 204 will yield regardless). Generally, the equation above may be weighted and the cost threshold set such that the autonomous vehicle 204 foregoes a generated yield trajectory and follows an original trajectory (or a different trajectory, e.g., by accelerating) in situations where the object 206 is predicted to barely enter the collision zone before the autonomous vehicle 204 exits the collision zone, with safety distances included in the size of the autonomous vehicle 204 and the object 206. The trajectory cost 226 as determined by the cost function determines a level of safety corresponding to a likelihood of collision between the autonomous vehicle 204 and the object 206 by comparing the predicted times that the autonomous vehicle 204 and the object 206 will enter the collision zone, and comparing the predicted times that autonomous vehicle 204 and the object 206 will exit the collision zone, as discussed in more detail in relation to FIG. 3B.

In examples, the planning component 228 may determine a vehicle trajectory 230 for the autonomous vehicle 204 to follow based on the trajectory cost 226. For instance, if the trajectory cost 226 for performing the yield trajectory as depicted in the example 214 is greater than the cost threshold, the planning component 228 may output a vehicle trajectory 230 causing the autonomous vehicle 204 to continue along the trajectory 208. If the trajectory cost 226 for performing the yield trajectory as depicted in the example 214 is less than or equal to the cost threshold, the planning component 228 may output a vehicle trajectory 230 causing the autonomous vehicle 204 yield to the object 206.

Figure 3A:
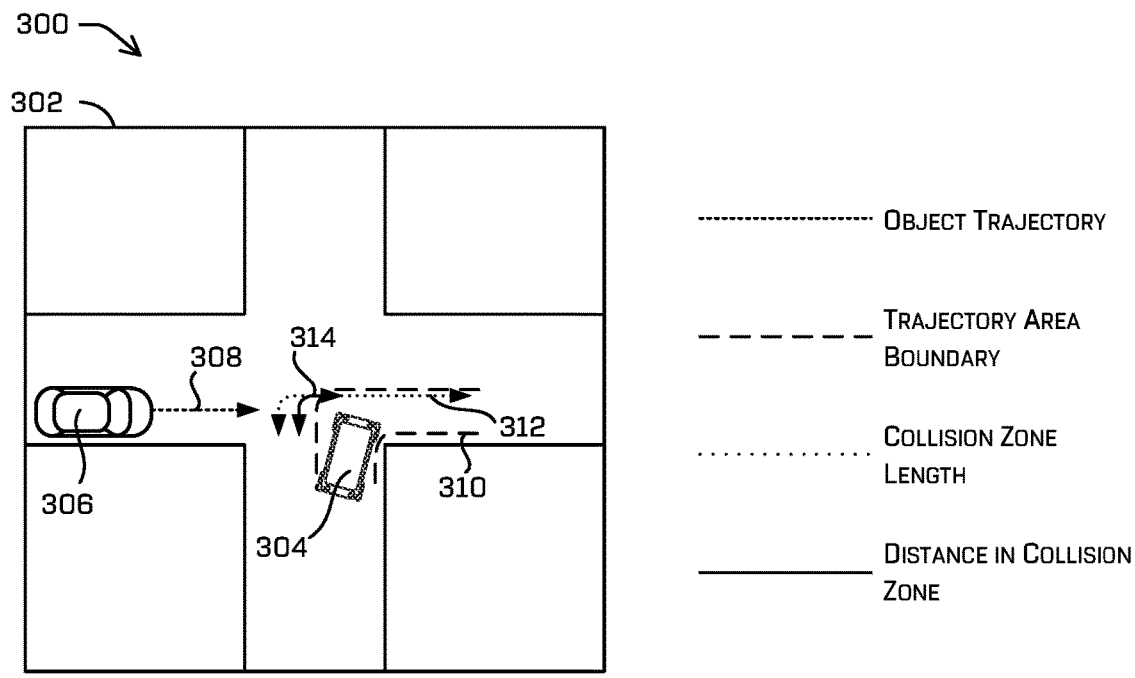
FIG. 3A is an illustration of different components of a collision zone, in accordance with examples of the disclosure.

FIG. 3A is an illustration 300 of different components of a collision zone, in accordance with examples of the disclosure.

An example 302 illustrates an autonomous vehicle 304 and an object 306 at a junction in an environment, in which the autonomous vehicle 304 is making a right-hand turn and the object 306 is predicted to follow a trajectory 308 straight through the junction. A trajectory area boundary 310 corresponds to an area of the autonomous vehicle 304 as the autonomous vehicle 304 executes the turn. A collision zone length 312 corresponds to the distance overlap component of the time-space overlap, which may add space between the autonomous vehicle 304 and the object 306 for safety. The distance in the collision zone 314 corresponds to a distance that the autonomous vehicle 304 has already proceeded into the collision zone, although in some cases, may incorporate the minimum distance to perform a yield action as well.

In some examples, one or more of the trajectory 308, the trajectory area boundary 310, the collision zone length, and/or the distance in the collision zone 314 may have an associated variance, which the autonomous vehicle 304 may incorporate into determining the time-space overlap. For instance, the autonomous vehicle 304 may determine a potential variance of the location of the object 306 within a lane when determining the trajectory 308. As mentioned above with reference to FIG. 2, the autonomous vehicle 304 may use a trajectory of the object 306 to determine the overlap area 216 (which, in turn, may be used to determine the collision zone). Thus, the autonomous vehicle 304 may determine a potential variance of the location of the object 306 within the lane, and add the potential variance to an area associated with a size of the object 306 following the trajectory 308 when determining a time-space overlap of the collision zone.

Alternatively or additionally, the autonomous vehicle 304 may determine a potential variance of a speed of the object 306 from a tracked speed of the object 306. For example, the potential variance of the speed of the object 306 may account for accelerations (e.g., to clear a junction when a traffic light turns yellow, to account for the object 306 going down a hill, etc.), decelerations (e.g., to allow the autonomous vehicle 304 to continue along its trajectory, to account for the object 306 going up a hill, to account for the object 306 making a turn, etc.). The autonomous vehicle 304 may account for potential variance of the tracked speed of the object 306 when determining the collision zone length 312, for instance, a potential acceleration would increase a length of the collision zone while potential deceleration would decrease a length of the collision zone.

As mentioned above, the autonomous vehicle 304 may apply a safety envelope when determining the collision zone, such as by adding additional space to a size of the autonomous vehicle 304 and/or the object 306 to prevent a collision between the two. In some examples, the autonomous vehicle 304 may determine a size of the safety envelope by determining a variance for each trajectory of multiple possible trajectories that the object 306 may follow. For instance, the variance may be based on a certainty of each trajectory of the multiple trajectories, an error associated with a speed of the object 306, an error associated with an acceleration (or deceleration), and the like.

Figure 3B:
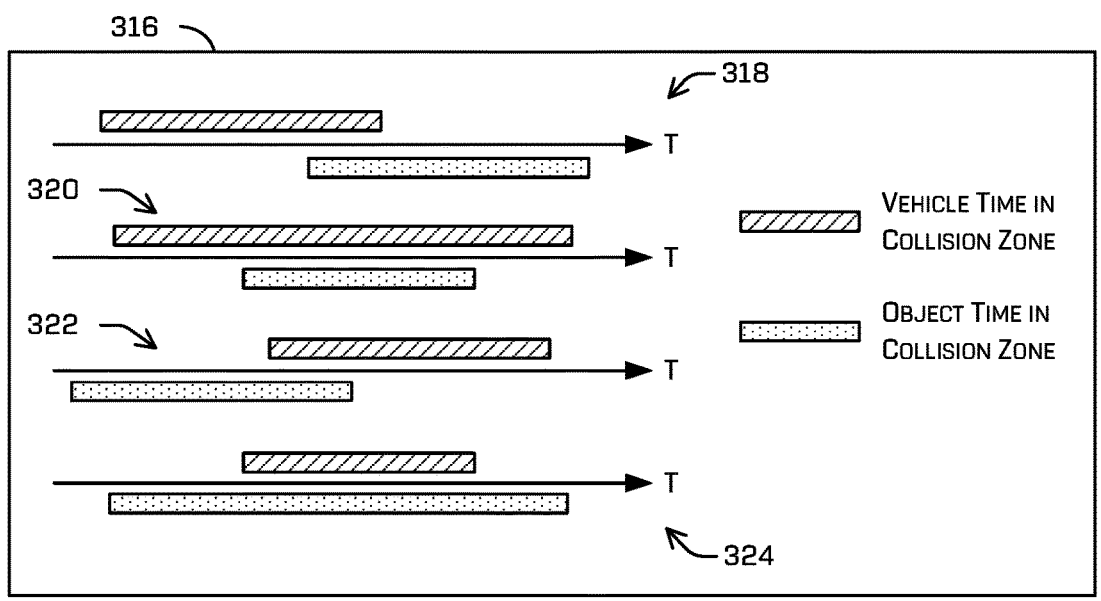
FIG. 3B is a graphical illustration of a time-space overlap between a vehicle and an object in an environment, in accordance with examples of the disclosure.

FIG. 3B is a graphical illustration 316 of a time-space overlap between a vehicle and an object in an environment, in accordance with examples of the disclosure. In the graphical illustration 316, the hashed bars correspond to a vehicle (e.g., an autonomous vehicle) time in a collision zone, while the dotted bars correspond to an object time in a collision zone, with respect to time (T).

A time-space overlap 318 illustrates an example in which the vehicle arrives in the collision zone before the object. In the time-space overlap 318, the vehicle has nearly exited the collision zone before the object enters the collision zone. In this case, the vehicle may determine that a cost to yield to the object would exceed a cost threshold, as the vehicle would likely block the object if the vehicle stopped or slowed down to yield, and would also exit the collision zone before a collision occurred. Therefore, the vehicle would continue along a trajectory through the collision zone without yielding based on the time-space overlap 318.

A time-space overlap 320 illustrates an example in which the vehicle arrives in the collision zone before the object. Unlike the time-space overlap 318, in the time-space overlap 320 the vehicle will not only still be in collision zone before the object enters the collision zone, but will also still be in the collision zone after the object is anticipated to leave the collision zone. In this case, the vehicle may determine that a cost to yield to the object would be less than a cost threshold, as the vehicle would not exit the collision zone without a likely collision despite also likely blocking the object to proceed through the junction. Therefore, the vehicle would yield to the object based on the time-space overlap 320.

A time-space overlap 322 illustrates an example in which the vehicle arrives in the collision zone after the object. In the time-space overlap 322, the object has nearly exited the collision zone before the vehicle enters the collision zone. In this case, the vehicle may determine that a cost to yield to the object would be less than a cost threshold, as it would be unlikely that the vehicle would block the object if the vehicle stopped or slowed down to yield. Therefore, the vehicle would yield to the object based on the time-space overlap 322.

A time-space overlap 324 illustrates another example in which the vehicle arrives in the collision zone after the object. In the time-space overlap 324, the object has entered the collision zone before the vehicle, and is also expected to stay in the collision zone for longer than it would take the vehicle to traverse the collision zone. Because the object arrived in the collision zone before the vehicle, the vehicle may determine that a cost to yield to the object would be less than a cost threshold, as it would be unlikely that the vehicle would block the object if the vehicle stopped or slowed down to yield. Therefore, the vehicle would yield to the object based on the time-space overlap 324.

Figure 4:
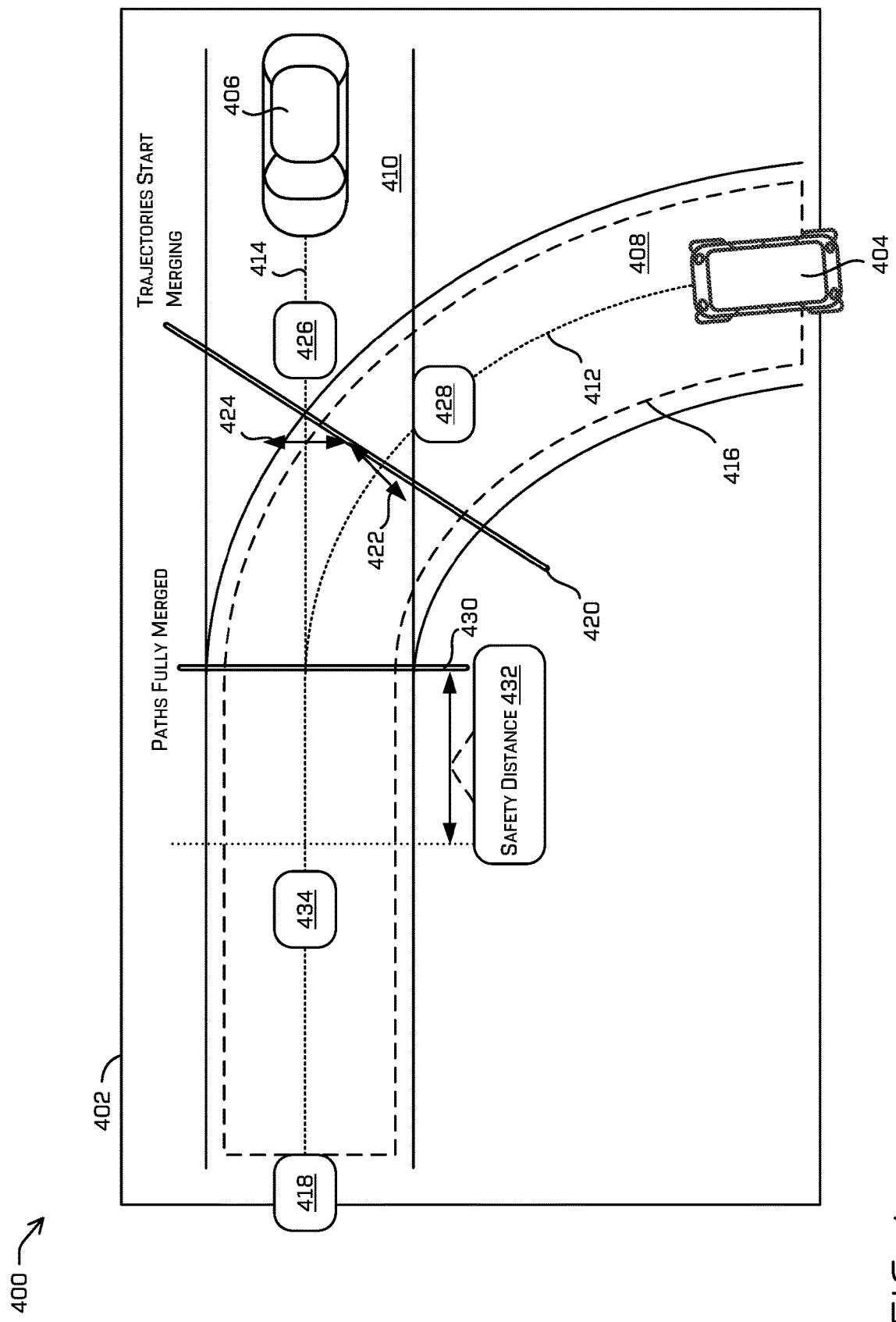
FIG. 4 depicts an example system for determining an updated collision zone based on a vehicle merging with an object in a lane, in accordance with examples of the disclosure.

FIG. 4 depicts an example system 400 for determining an updated collision zone based on a vehicle merging with an object in a lane, in accordance with examples of the disclosure.

An example 402 illustrates a vehicle 404 and an object 406 in an environment proximate a junction. In this example 402, the junction may be of a type that permits vehicles from a first lane to merge with vehicles in a second lane, such as a traditional 4-way stop (e.g., where a vehicle may turn left or right into another lane), a T-junction, a highway on-ramp, a highway off-ramp merging with another highway or non-highway traffic, and so forth. In the example 402, the vehicle 404 is in a first lane 408 and is planning to merge into a second lane 410 currently occupied by the object 406, and follow the object 406 into the second lane 410 (e.g., yielding to the object 406).

In some examples, the vehicle 404 may receive map data of the environment, which may be used to make determinations on how to proceed through the environment, generate trajectories to follow through the environment, and the like. As part of the map data, the vehicle 404 may receive a path 412 that corresponds to the first lane 408, where the path 412 may generally follow a center of the first lane 408. Similarly, the vehicle 404 may receive a path 414 that corresponds to the second lane 410, and generally follows a center of the second lane 410. Additionally, in some examples, the vehicle 404 may generate an envelope 416 corresponding to a planned trajectory of the vehicle 404 with a safety distance surrounding a size of the vehicle 404 as the vehicle 404 follows the planned trajectory.

The vehicle 404 may determine a collision zone as part of the merge action into the second lane 410. In some cases, the vehicle 404 may determine an exit point for the collision zone based at least in part on the map data. For instance, the vehicle 404 may determine a first exit point 418 based on an extent of the junction received in the map data. In many cases, the first exit point 418 provides the vehicle 404 with a conservative location to end the collision zone, where a collision with the object 406 is highly unlikely. However, in some examples, the conservative location of the first exit point 418 may cause the vehicle 404 to block traffic while the vehicle 404 waits for the object 406 to exit the collision zone before proceeding into the collision zone. Therefore, some scenarios exist in which reducing the size of the collision zone would not reduce safety of the merge action between the vehicle 404 and the object 406, but would increase safety and efficiency by allowing the vehicle 404 to clear the junction (or a portion of the junction) sooner than if the first exit point 418 of the collision zone was used.

In some examples, the vehicle 404 may determine a collision zone by determining a location 420 where the trajectories of the vehicle 404 and the object 406 begin to merge. For instance, the vehicle 404 may determine the location 420 using a projection 422 of the vehicle 404 along the path 412, and a projection 424 of the object 406 along the path 414. The projection 422 may correspond to a size of the vehicle 404 (and may include a safety envelope surrounding the size of the vehicle 404), and the projection 424 may correspond to a size of the object 406, based on an average vehicle size, a detected size of the object 406 based on sensor data, and the like. The vehicle 404 may assign the location 420 based on where the projection 422 and the projection 424 are predicted to intersect. In some examples, the location 420 may be used to determine entry points to the collision zone. For instance, the vehicle 404 may determine an entry point 426 for the object 406 to enter the collision zone, and may determine an entry point 428 for the vehicle 404 to enter the collision zone. As shown, the entry point 426 and the entry point 428 occur before the location 420 where a collision is predicted to occur, to cause the vehicle 404 to take preventative action prior to a collision occurring.

Additionally, in some examples, the vehicle 404 may determine a merge location 430 where the path 412 and the path 414 have fully merged into a single path in the second lane 410. In some cases, the merge location 430 may be generated by the vehicle 404 as the vehicle 404 traverses the environment, and/or may be received with the map data of the environment (e.g., previously generated). The vehicle 404 may use the merge location 430 to determine an updated exit point 434 for the collision zone. In some examples, the vehicle 404 may add a safety distance 432 to the merge location 430 when determining the updated exit point 434 for the collision zone. The safety distance 432 may be a distance that prevents a collision between the vehicle 404 and the object 406. For instance, a greater safety distance 432 may be necessary when the vehicle 404 and/or the object 406 are moving at faster speeds, such that if the object 406 stops, the vehicle 404 would have time to stop before a collision occurred. Therefore, the safety distance 432 may be based on a current speed of the vehicle 404, a current speed of the object 406, a speed limit associated with the second lane 410, an estimated time for the vehicle 404 to reach the speed limit for the second lane 410 from a current speed, an estimated time for the vehicle 404 to stop from a current speed, and/or any combination of these or other factors. In most cases, even with the safety distance 432 added to the merge location 430, the collision zone will be smaller than if the extents of the junction were used to determine the collision zone. Therefore, the amount of space between the vehicle 404 and the object 406 is reduced during and after the merge takes place (while maintaining a safe distance), and the likelihood of the vehicle 404 blocking the junction is reduced.

Examples are also considered in which the vehicle 404 enters the second lane 410 (and thus also enters the collision zone) prior to the object 406 entering the collision zone. In other words, the vehicle 404 may determine that it has sufficient time to enter the collision zone without yielding, as described in relation to FIGS. 2-3B. In some cases, the vehicle 404 may not entirely exit the collision zone prior to the object entering the collision zone, such as is often the case in stop-and-go traffic when a vehicle changes lanes and another vehicle closely follows. Conventional techniques would often result in the vehicle 404 attempting to perform a yield in such an example, to accommodate the perceived aggressive maneuver by the object 406. However, yielding in this example would cause frustration and slowed flow of traffic, as the object 406 would not have room to proceed around the vehicle 404.

Therefore, in the described techniques, when the vehicle 404 has entered the second lane 410 and in the collision zone, the vehicle 404 may detect that the object 406 is within a threshold distance of the vehicle 404 in the second lane 410 (e.g., within 2 meters, within 5 meters, within 10 meters, etc.). Rather than perform a yield, the vehicle 404 may generate a trajectory based on a prediction that the object 406 will follow the vehicle 404 in the second lane 410 despite the close proximity of the object. The trajectory not only prevents the vehicle 404 from yielding to the object (and therefore blocking traffic), but also causes the vehicle 404 to proceed in the second lane 410 along a route to a destination.

Figure 5:
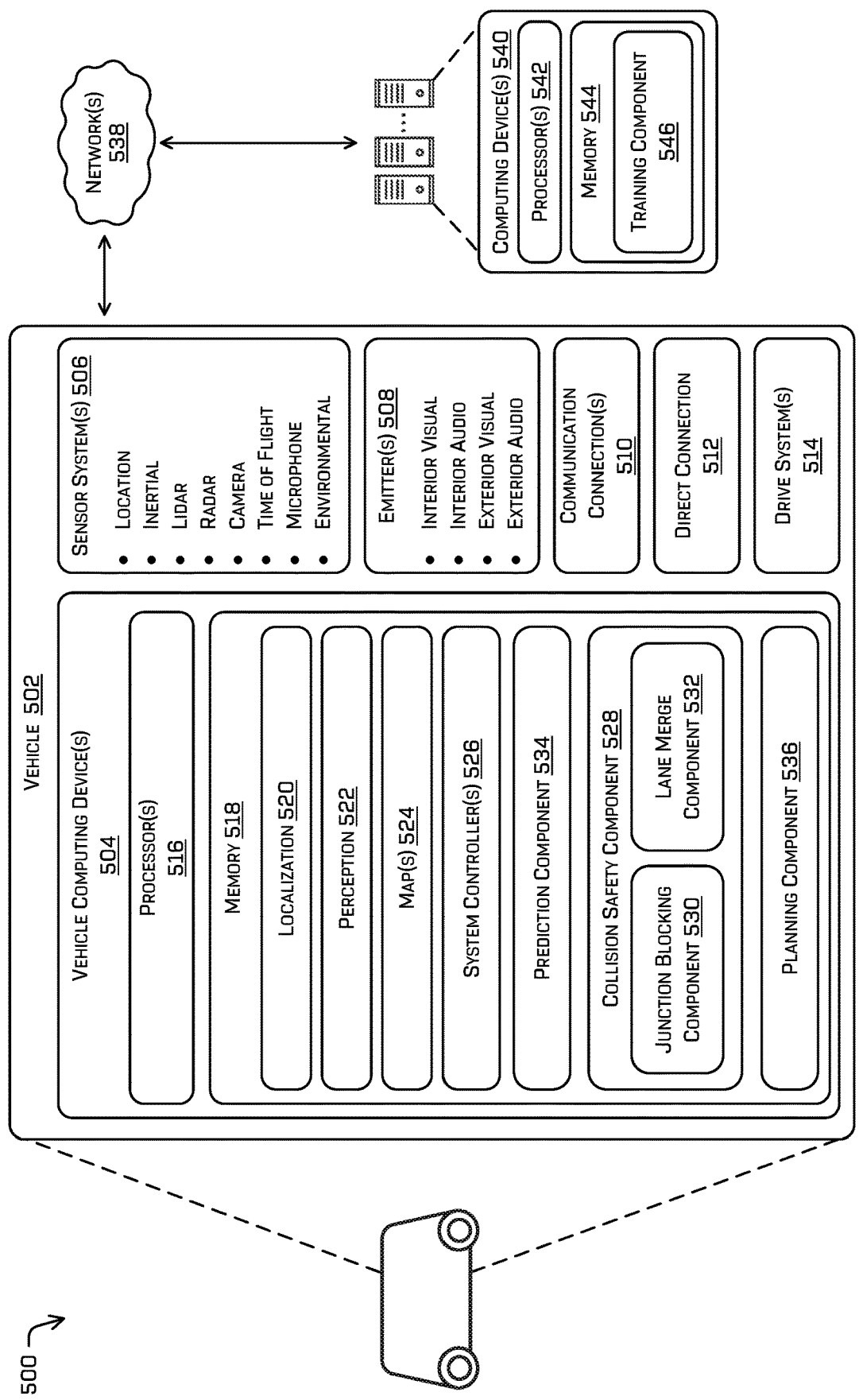
FIG. 5 depicts a block diagram of an example system for implementing the techniques described herein.

FIG. 5 depicts a block diagram of an example system for implementing the techniques described herein. In at least one example, the system 500 can include a vehicle 502, such as an autonomous, semi-autonomous, or manually controlled vehicle.

The vehicle 502 can include vehicle computing device(s) 504, one or more sensor systems 506, one or more emitters 508, one or more communication connections 510, at least one direct connection 512, and one or more drive systems 514.

The vehicle computing device(s) 504 can include one or more processors 516 and memory 518 communicatively coupled with the one or more processors 516. In the illustrated example, the vehicle 502 is an autonomous vehicle; however, the vehicle 502 could be any other type of vehicle or robotic platform. In the illustrated example, the memory 518 of the vehicle computing device(s) 504 stores a localization component 520, a perception component 522, one or more maps 524, one or more system controllers 526, a collision safety component 528, a junction blocking component 530, an lane merge component 532, a prediction component 534, and a planning component 536. Though depicted in FIG. 5 as residing in the memory 518 for illustrative purposes, it is contemplated that the localization component 520, the perception component 522, the one or more maps 524, the one or more system controllers 526, the collision safety component 528, the junction blocking component 530, the lane merge component 532, the prediction component 534, and the planning component 536 can additionally, or alternatively, be accessible to the vehicle 502 (e.g., stored on, or otherwise accessible by, memory remote from the vehicle 502).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory, for determining to retrieve map data, and so forth, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, truck, pedestrian, cyclist, animal, building, tree, road surface, curb, sidewalk, stoplight, stop sign, lane marker, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 522 performs detection, the perception component 522 may output detections of objects in an image. Such detections may comprise two-dimensional bounding boxes and/or masks of detected objects. In some examples, such detection may utilize a machine learning approach (e.g., scale-invariant feature transform (SIFT), histogram of oriented gradients (HOG), etc.) followed by a support vector machine (SVM) to classify objects depicted in images received from a camera of the sensor system 506. Alternatively or additionally, detection may utilize a deep learning approach based on a convolutional neural network (CNN) to classify objects depicted in images received from a camera of the sensor system 506.

The memory 518 can further include one or more maps 524 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 524 can include at least one map (e.g., images and/or a mesh). In some examples, the vehicle 502 can be controlled based at least in part on the maps 524. That is, the maps 524 can be used in connection with the localization component 520, the perception component 522, the collision safety component 528, the prediction component 534, or the planning component 536 to determine a location of the vehicle 502, identify objects in an environment, and/or generate routes and/or trajectories to navigate within an environment.

In some examples, the one or more maps 524 can be stored on a remote computing device(s) (such as the computing device(s) 540) accessible via network(s) 538. In some examples, multiple maps 524 can be stored based on, for example, a characteristic (e.g., type of entity, time of day, day of week, season of the year, etc.). Storing multiple maps 524 can have similar memory requirements, but increase the speed at which data in a map can be accessed. In some examples, the one or more maps 524 can store sizes or dimensions of objects associated with individual locations in an environment. For example, as the vehicle 502 traverses the environment and as maps representing an area proximate to the vehicle 502 are loaded into memory, one or more sizes or dimensions of objects associated with a location can be loaded into memory as well. In some examples, the one or more maps 524 may include junction extent information, lane merge locations, and the like as described herein.

The prediction component 534 can generate predictions of object behavior based at least in part on sensor data received form the sensor system 506. For example, the prediction component 534 may generate one, or multiple, predicted trajectories for an object detected in the environment. Additionally, in some cases, the prediction component 534 can determine variances in position, location, speed, acceleration, and the like for each predicted trajectory generated for a particular object. The prediction component 534 may output the predicted trajectories to the collision safety component 528 to use in generating collision zones, as described herein.

In general, the collision safety component 528 can generate one or more trajectories for the vehicle 502 to prevent a collision with an object in the environment based on data (e.g., sensor data) provided by the sensor system(s) 506, data provided by the one or more maps 524, and/or the predicted trajectories received from the prediction component 534. In some instances, the collision safety component 528 can provide information generated by the junction blocking component 530, the lane merge component 532, and/or the prediction component 534 to the planning component 536 to determine when and/or how to control the vehicle 502 to traverse an environment. As discussed herein, the collision safety component 528 can receive image data, map data, lidar data, and the like to determine information about objects in an environment.

The junction blocking component 530 may receive the predicted trajectories from the prediction component 534 and determine that a collision may occur with the object based on predicted trajectories of the object and the trajectory of the vehicle 502. The junction blocking component 530 may generate a collision zone based on a current trajectory of the vehicle 502 and any number of predicted trajectories of the object. In some examples, the junction blocking component 530 assesses a yield trajectory (in addition to the current trajectory) by evaluating a cost function, where the cost function is based on a time-space overlap of the vehicle 502 and the object in the collision zone. If an output of the cost function indicates that the vehicle 502 would block traffic and that a collision will not occur (or is highly unlikely to occur), the junction blocking component 530 may prevent the instruction to yield from being sent to the planning component 536. Otherwise, the junction blocking component 530 may permit the yield instruction to be sent to the planning component 536.

The lane merge component 532 may also receive the predicted trajectories from the prediction component 534, and determine lanes in the environment (e.g., from the one or more maps 524), in a scenario where the vehicle 502 is merging into a lane with the object. In some examples, the lane merge component 532 may determine a merge location at which a path of the first lane (where the vehicle 502 is currently located) and a path of the second lane (into which the vehicle 502 is merging) merge. The lane merge component 532 may determine an exit point for a collision zone associated with the vehicle 502 and the object based on the merge location, and in some cases, by adding a safety distance to the merge location to add space between the vehicle 502 and the object following the merge.

In general, the planning component 536 can determine a path for the vehicle 502 to follow to traverse the environment. For example, the planning component 536 can determine various routes and trajectories and various levels of detail. For example, the planning component 536 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 536 can generate an instruction for guiding the autonomous vehicle along at least a portion of the route from the first location to the second location. In at least one example, the planning component 536 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In some instances, the planning component 536 can generate one or more trajectories for the vehicle 502 based at least in part on a yield trajectory cost and/or an updated merge location, as discussed herein. In some examples, the planning component 536 can use temporal logic, such as linear temporal logic and/or signal temporal logic, to evaluate one or more trajectories of the vehicle 502.

In at least one example, the vehicle computing device(s) 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

As can be understood, the components discussed herein (e.g., the localization component 520, the perception component 522, the one or more maps 524, the one or more system controllers 526, the collision safety component 528, the junction blocking component 530, the lane merge component 532, the prediction component 534, and the planning component 536) are described as divided for illustrative purposes. However, the operations performed by the various components can be combined or performed in any other component. By way of example, functions described in relation to the collision safety component 528, the junction blocking component 530, the lane merge component 532, and/or the prediction component 534 may be performed by the perception component 522 to reduce the amount of data transferred by the system.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the lidar sensors can include individual lidar sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504. Additionally or alternatively, the sensor system(s) 506 can send sensor data, via the one or more networks 538, to the one or more computing device(s) at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communication connection(s) 510 also enable the vehicle 502 to communicate with a remote teleoperations computing device or other remote services.

The communication connection(s) 510 can include physical and/or logical interfaces for connecting the vehicle computing device(s) 504 to another computing device or a network, such as network(s) 538. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 5G, 5G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the localization component 520, the perception component 522, the one or more maps 524, the one or more system controllers 526, the collision safety component 528, the junction blocking component 530, the lane merge component 532, the prediction component 534, and the planning component 536 can process sensor data, as described above, and can send their respective outputs, over the one or more network(s) 538, to one or more computing device(s) 540. In at least one example, the localization component 520, the perception component 522, the one or more maps 524, the one or more system controllers 526, the collision safety component 528, the junction blocking component 530, the lane merge component 532, the prediction component 534 and the planning component 536 can send their respective outputs to the one or more computing device(s) 540 at a particular frequency, after a lapse of a predetermined period of time, in near real-time, etc.

In some examples, the vehicle 502 can send sensor data to one or more computing device(s) 540 via the network(s) 538. In some examples, the vehicle 502 can send raw sensor data to the computing device(s) 540. In other examples, the vehicle 502 can send processed sensor data and/or representations of sensor data to the computing device(s) 540. In some examples, the vehicle 502 can send sensor data to the computing device(s) 540 at a particular frequency, after a lapse of a predetermined period of time, in near real-time, etc. In some cases, the vehicle 502 can send sensor data (raw or processed) to the computing device(s) 540 as one or more log files.

The computing device(s) 540 can include processor(s) 542 and a memory 544 storing a training component 546.

In some instances, the training component 546 can include functionality to train one or more models to detect objects in an environment, predict object behavior, and the like. For instance, aspects of some or all of the components discussed herein can include any models, algorithms, and/or machine learning algorithms. For example, in some instances, the components in the memory 544 (and the memory 518, discussed above) can be implemented as a neural network. In some examples, the training component 546 can utilize a neural network to generate and/or execute one or more models to improve various aspects of object behavior prediction for use in trajectory planning of the vehicle 502.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 516 of the vehicle 502 and the processor(s) 542 of the computing device(s) 540 can be any suitable processor capable of executing instructions to process data and perform operations as described herein. By way of example and not limitation, the processor(s) 516 and 542 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 544 are examples of non-transitory computer-readable media. The memory 518 and 544 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 540 and/or components of the computing device(s) 540 can be associated with the vehicle 502. That is, the vehicle 502 can perform one or more of the functions associated with the computing device(s) 540, and vice versa. Further, aspects of the collision safety component 528 and/or the planning component 536 can be performed on any of the devices discussed herein. For example, any or all of the functionality and components described with reference to FIGS. 1-4 can be implemented by the collision safety component 528 or other components of vehicle 502.

Figure 6:
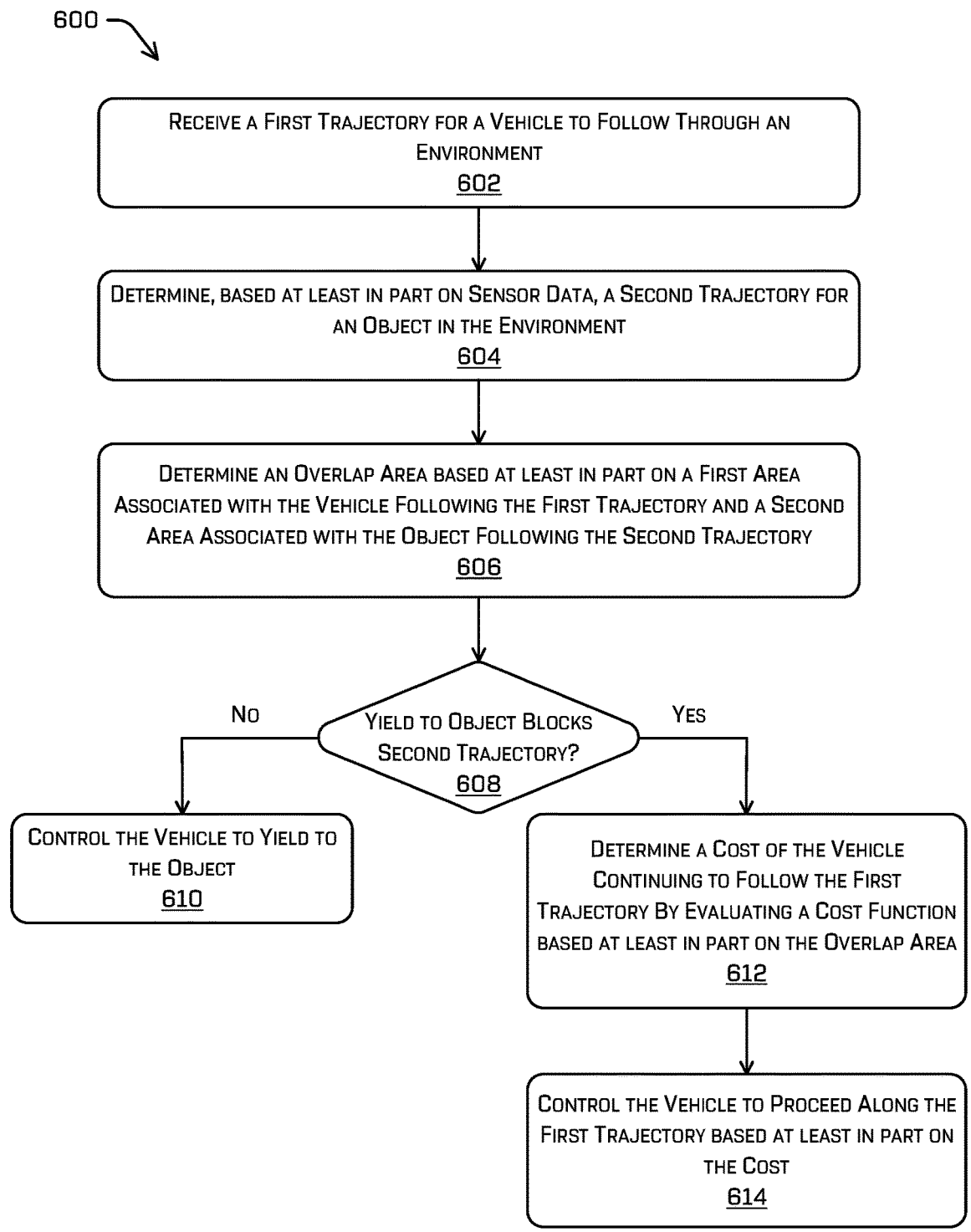
FIG. 6 depicts an example process for determining a cost for a vehicle to follow a trajectory based on a determination that yielding to the object would block a trajectory of the object, in accordance with examples of the disclosure.

FIG. 6 depicts an example process 600 for determining a cost for a vehicle to follow a trajectory based on a determination that yielding to the object would block a trajectory of the object, in accordance with examples of the disclosure. For example, some or all of the process 600 can be performed by one or more components in FIG. 5, as described herein. For example, some or all of the process 600 can be performed by the vehicle computing device(s) 504, the computing device(s) 540, or any other computing device or combination of computing devices. Further, any of the operations described in the example process 600 may be executed in parallel, in a different order than depicted in the process 600, omitted, combined with the process 700, combined with other processes, and the like.

An operation 602 includes receiving a first trajectory for a vehicle to follow through an environment. In some examples, the trajectory may be generated by the vehicle based on map data, sensor data, and the like as the vehicle traverses the environment. Examples are also considered in which the trajectory is received from a remote computing device, such as the computing device 540.

An operation 604 includes determining, based at least in part on sensor data, a second trajectory for an object in the environment. In examples, sensors such as lidar sensors, radar sensors, time of flight sensors, and the like may be included on the vehicle, which capture corresponding types of sensor data as the vehicle traverses the environment. The sensor data may be used to detect the object in the environment, along with determining an object type of the object, a speed or velocity of the object, characteristics of the object, a location of the object relative to the vehicle or landmarks in the environment, and so forth. In some examples, the trajectory for the object may be a predicted trajectory that the object will follow through the environment, based on information about the object determined based on the sensor data.

An operation 606 includes determining an overlap area based at least in part on a first area associated with the vehicle following the first trajectory and a second area associated with the object following the second trajectory. As discussed above in relation to FIG. 2, the overlap area may be based in part on an area of a size of the object as the object follows the predicted trajectory. The overlap area may also be based on a size of the vehicle following a trajectory through the area associated with the object following the predicted trajectory.

An operation 608 includes determining whether yielding to the object blocks the second trajectory of the object. For instance, if the vehicle stops or slows down, the vehicle may determine that the object's predicted trajectory is blocked by the vehicle as stopped or slowed.

If it is determined that yielding to the object does not block the second trajectory ("No" at operation 608), the process may proceed to an operation 610, which includes controlling the vehicle to yield to the object. However, if it is determined that yielding to the object does not block the second trajectory ("Yes" at operation 608), the process may proceed to an operation 612, which includes determining a cost of the vehicle continuing to follow the first trajectory by evaluating a cost function based at least in part on the overlap area. In some examples, the vehicle may evaluate a cost function for performing a yield to the object. As discussed above, the cost function may include a first term associated with a time overlap component of the time-space overlap of the vehicle and the object. In some examples, the time overlap component may be based on predicted times for the vehicle to reach corresponding entry and exit points of the overlap area, and predicted times for the object to reach corresponding entry and exit points of the overlap area.

The cost function may also include a second term associated with a distance overlap component, which evaluates a distance that the vehicle has proceeded into the junction proportionate to the entire length of the collision zone. The distance overlap component determines whether the vehicle has proceeded far enough into the junction to already be blocking the path of the object, and if so, may be used by a planning component to cause the vehicle to continue along the first trajectory (and/or to accelerate to exit the junction faster, for instance).

An operation 614 includes controlling the vehicle to proceed along the first trajectory based at least in part on the cost. For instance, the vehicle may determine that following the original trajectory will not result in a collision, but yielding to the object will prevent the object from proceeding along the predicted trajectory of the object and/or block traffic at the junction. Therefore, the vehicle may proceed along the trajectory and prevent the yield trajectory from being executed if the cost of performing the yield trajectory is greater than a trajectory threshold.

Figure 7A:
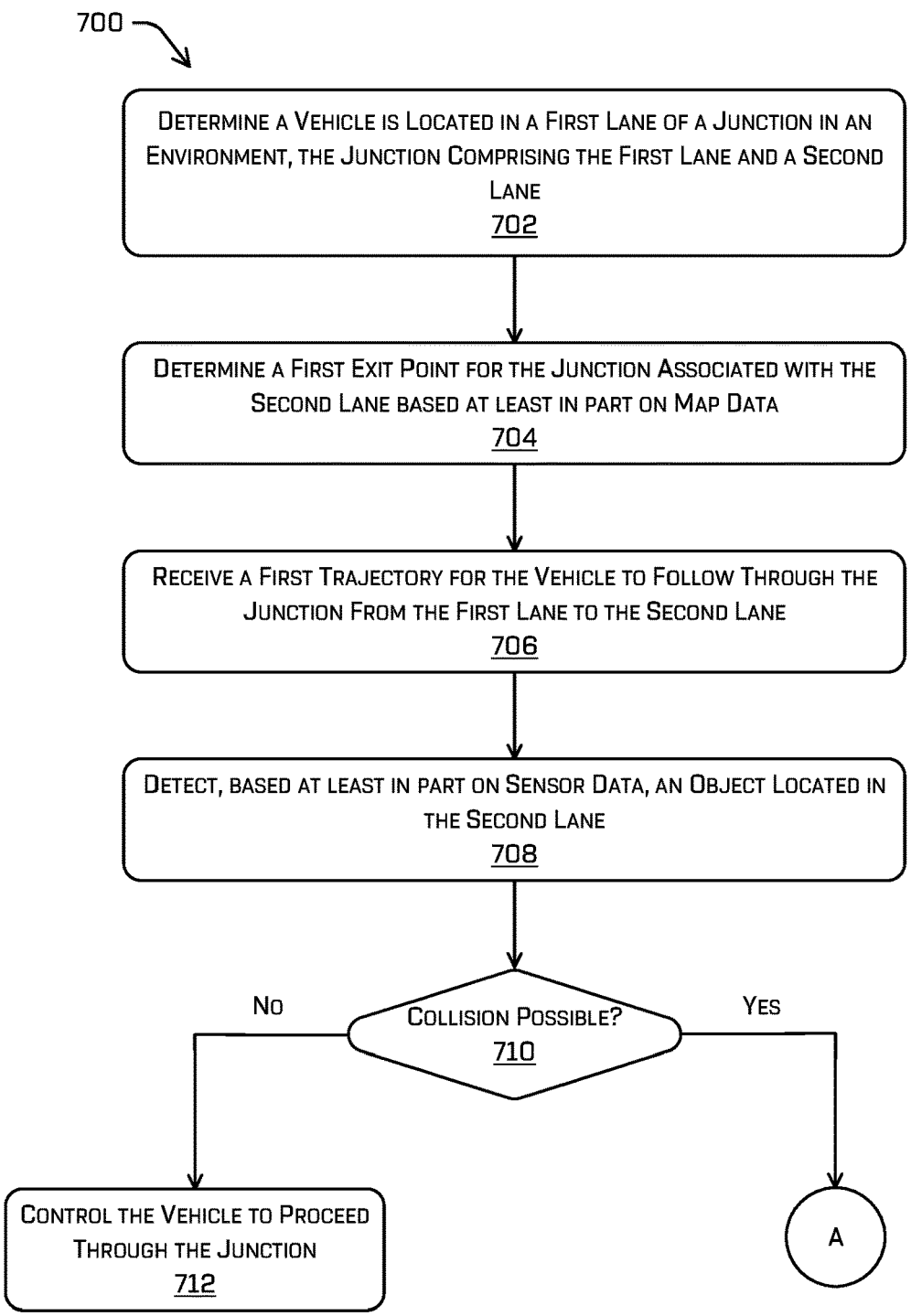
FIGS. 7A and 7B depict an example process for determining that a collision is possible between a vehicle and an object merging into a lane, and updating collision zone based on a merge location of paths in the lane, in accordance with examples of the disclosure.
Figure 7B:
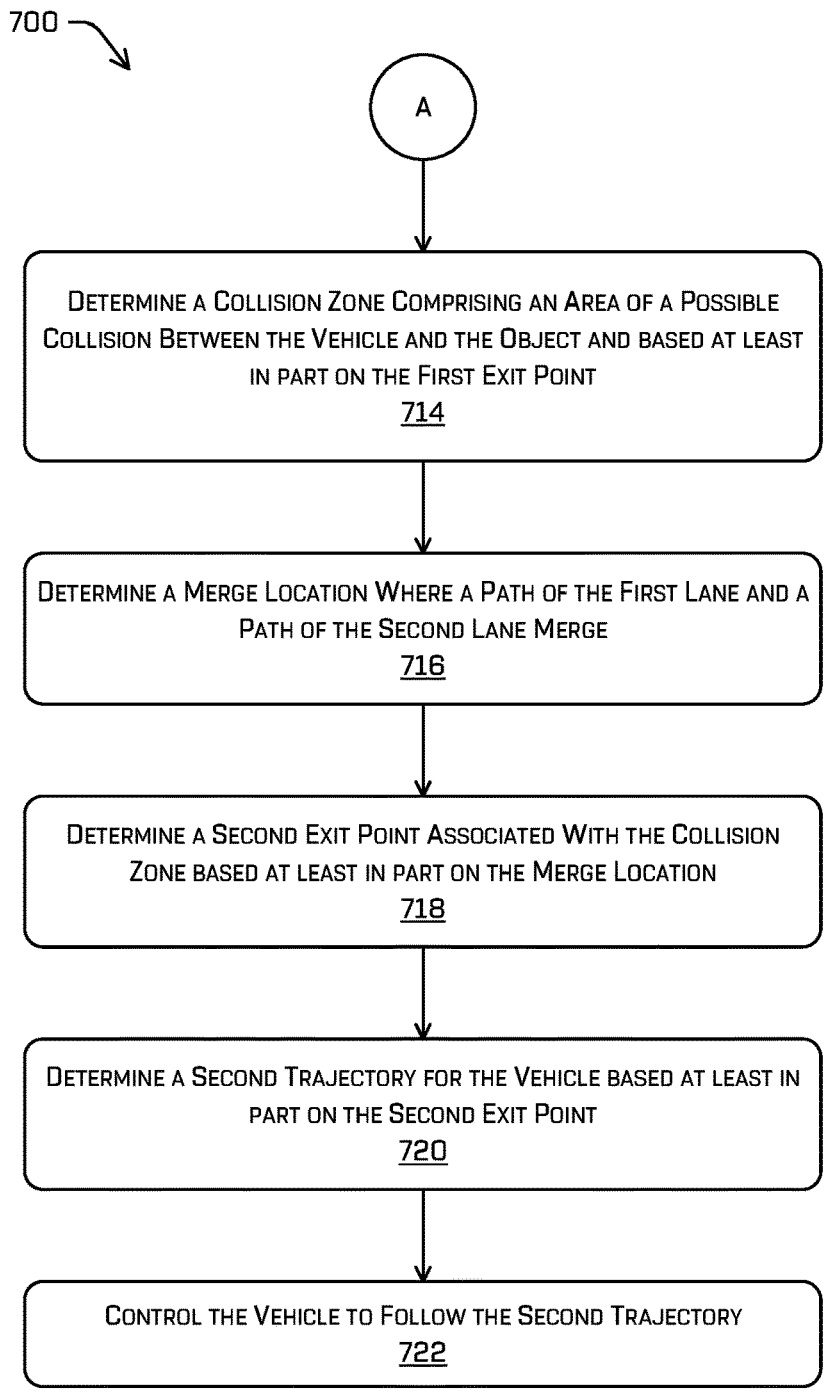

FIGS. 7A and 7B depict an example process 700 for determining that a collision is possible between a vehicle and an object merging into a lane, and updating collision zone based on a merge location of paths in the lane, in accordance with examples of the disclosure. For example, some or all of the process 700 can be performed by one or more components in FIG. 5, as described herein. For example, some or all of the process 700 can be performed by the vehicle computing device(s) 504, the computing device(s) 540, or any other computing device or combination of computing devices. Further, any of the operations described in the example process 700 may be executed in parallel, in a different order than depicted in the process 700, omitted, combined with the process 600, combined with other processes, and the like.

An operation 702 includes determining that a vehicle is located in a first lane of a junction in an environment, where the junction comprises the first lane and a second lane. For example, the vehicle may determine, from map data and/or a localization system, that the vehicle is located at a junction. The vehicle may detect that the junction is a merge-type junction (highway entrance/exit or the like), traffic light junction, 4-way stop, uncontrolled intersection, and so forth.

An operation 704 includes determining a first exit point for the junction associated with the second lane based at least in part on map data. For instance, the first exit point may be based on an extent of the junction in the second lane as indicated in map data.

An operation 706 includes receiving a first trajectory for the vehicle to follow through the junction from the first lane to the second lane. In some examples, the first trajectory may be generated by the vehicle based on map data, sensor data, and the like as the vehicle traverses the environment.

Examples are also considered in which the first trajectory is received from a remote computing device, such as the computing device 540.

An operation 708 includes detecting, based at least in part on sensor data, an object located in the second lane. In examples, sensors such as lidar sensors, radar sensors, time of flight sensors, and the like may be included on the vehicle, which capture corresponding types of sensor data as the vehicle traverses the environment. The sensor data may be used to detect the object in the environment, along with determining an object type of the object, a speed or velocity of the object, characteristics of the object, the location of the object in the second lane, and so forth. In some examples, the vehicle may determine a predicted trajectory for the object through the environment, based on information about the object determined based on the sensor data.

An operation 710 includes determining whether a collision is possible between the vehicle and the object. For instance, the vehicle may determine areas associated with the vehicle following the first trajectory and the object following a predicted trajectory, and that the areas may overlap. In some cases, the vehicle may account for potential variances for location (e.g., position of the object or vehicle within a lane), speed, acceleration, and the like when determining whether a collision is possible between the vehicle and the object.

If the vehicle determines that a collision is not possible (or is highly unlikely, or "No" at operation 710), the process may proceed to an operation 712, in which the vehicle is controlled to proceed through the junction. For instance, the vehicle may continue to follow the first trajectory through the junction. However, if the vehicle determines that a collision is possible (or is likely to occur, or "Yes" at operation 710), the process may proceed through "A" to operation 714 of FIG. 7B.

The operation 714 includes determining a collision zone comprising an area of a possible collision between the vehicle and the object and based at least in part on the first exit point. In other words, an exit point of the collision zone may correspond to an extent of the junction as received from map data. In some cases, the vehicle may determine entry points for the vehicle and the object based on an area associated with the vehicle following the first trajectory through the junction (and may include a safety envelope), and an area associated with the object following a predicted trajectory.

An operation 716 includes determining a merge location where a path of the first lane and a path of the second lane merge. In examples, the merge location may be determined from map data. Additionally, in some cases, the paths of the respective lanes may correspond generally to a center of a lane, and/or may correspond to the first trajectory of the vehicle and the predicted trajectory of the object.

An operation 718 includes determining a second exit point associated with the collision zone based at least in part on the merge location. In some instances, the second exit point may reduce the size of the collision zone from the size of the collision zone determined based on the extent of the junction. In some cases, the vehicle may add a safety distance to the merge location, where the second exit point is outside of the safety distance. The safety distance may be based on a speed limit of the second lane, a speed of the object, predicted acceleration and/or deceleration of the object, and the like as described above.

An operation 720 includes determining a second trajectory for the vehicle based at least in part on the second exit point. For example, the first trajectory may cause the vehicle to provide unnecessary space between the vehicle and the object during and/or after the merge, and/or may block traffic in the junction as the vehicle is prevented from exiting the junction. The second trajectory, on the other hand, may reduce the space between the vehicle and the object during and/or after the merge, and/or may prevent the vehicle from blocking traffic in the junction during and/or after the merge. Finally, an operation 722 includes controlling the vehicle to follow the second trajectory.

Example Clauses

A: A system comprising: one or more processors; and one or more computer-readable media storing instructions that, when executed by the one or more processors, perform operations comprising: determining a junction in an environment based at least in part on map data, the junction comprising a first lane and a second lane; determining that an autonomous vehicle is located in the first lane; determining a first exit point associated with the second lane of the junction based at least in part on the map data; determining a first trajectory for the autonomous vehicle to follow through the junction from the first lane into the second lane and passing through the first exit point; detecting, based at least in part on sensor data, an object located in the second lane; determining an overlap area comprising a first area of a possible overlap between the autonomous vehicle and the object and based at least in part on a second area associated with the first trajectory; determining, based at least in part on detecting the object, a merge location at which a path of the first lane and a path of the second lane merge; determining a second exit point associated with the overlap area based at least in part on the merge location; determining a second trajectory for the autonomous vehicle based at least in part on the second exit point; and controlling the autonomous vehicle to follow the second trajectory.

B: The system of paragraph A, wherein the second exit point for the overlap area reduces a size of the overlap area from the first exit point of the overlap area.

C: The system of paragraph A or B, wherein the second exit point for the overlap area is further based on a safety distance added to the merge location.

D: The system of paragraph C, wherein the safety distance is based at least in part on one or more of a speed limit associated with the second lane or a trajectory of the object.

E: A method comprising: determining a junction in an environment, the junction comprising a first lane and a second lane; detecting an object located in the second lane; determining, responsive to detecting the object, a merge location at which a first path of the first lane and a second path of the second lane merge; determining an exit point for an overlap area associated with a vehicle and the object based at least in part on the merge location; determining a trajectory for the vehicle to enter the second lane based at least in part on the exit point; and controlling the vehicle to follow the trajectory.

F: The method of paragraph E, wherein the trajectory is a first trajectory and the vehicle enters the second lane prior to the object entering the overlap area, the method further comprising: detecting that the object enters a threshold distance of the vehicle in the overlap area; and determining a second trajectory for the object, the second trajectory responsive to the object entering the threshold distance and based at least in part on a prediction that the object will follow the vehicle in the second lane, wherein controlling the vehicle to follow the trajectory comprises preventing the vehicle from yielding to the object based at least in part on the second trajectory for the object.

G: The method of paragraph E or F, wherein the trajectory for the vehicle to enter the second lane comprises a turn action or a merge action.

H: The method of any of claims E-G, wherein the first path substantially follows a first center line of the first lane and the second path substantially follows a second center line of the second lane.

I: The method of any of claims E-H, further comprising: determining a size of the junction from map data; and determining first dimensions of the overlap area based at least in part on the size of the junction, wherein determining the exit point for the overlap area comprises determining second dimensions of the overlap area, the second dimensions being smaller than the first dimensions.

J: The method of any of claims E-I, wherein determining the exit point for the overlap area is further based on a safety distance added to the merge location.

K: The method of paragraph J, wherein the safety distance is based at least in part on a speed limit associated with the second lane or a trajectory of the object.

L: The method of paragraph K, wherein the safety distance is further based on a time for the vehicle to reach the speed limit from a current speed.

M: One or more computer-readable media storing instructions that, when executed by one or more processors, perform operations comprising: determining a junction in an environment, the junction comprising a first lane and a second lane; determining a vehicle trajectory for a vehicle to enter the second lane from the first lane and into the second lane; detecting an object located in the second lane; determining an object trajectory associated with the object; determining a merge location at which a first path of the first lane and a second path of the second lane merge; determining an overlap area between an area associated with the vehicle trajectory and the object trajectory; determining an exit point for the overlap area based at least in part on the merge location; altering, as an adjusted vehicle trajectory and based at least in part on the exit point, the vehicle trajectory; and controlling the vehicle to follow the adjusted vehicle trajectory.

N: The one or more computer-readable media of paragraph M, wherein the operations further comprise: detecting that the object enters a threshold distance of the vehicle in the overlap area; and determining a second object trajectory for the object responsive to the object entering the threshold distance and based at least in part on a prediction that the object will follow the vehicle in the second lane, wherein controlling the vehicle to follow the adjusted vehicle trajectory comprises preventing the vehicle from yielding to the object based at least in part on the second object trajectory for the object.

O: The one or more computer-readable media of paragraph M or N, wherein the vehicle trajectory for the vehicle to enter the second lane comprises a turn action or a merge action.

P: The one or more computer-readable media of any of claims M-O, wherein the first path substantially follows a first center line of the first lane and the second path substantially follows a second center line of the second lane.

Q: The one or more computer-readable media of any of claims M-P, the operations further comprising: determining a size of the junction from map data; and determining first dimensions of the overlap area based at least in part on the size of the junction, wherein determining the exit point for the overlap area comprises determining second dimensions of the overlap area, the second dimensions being smaller than the first dimensions.

R: The one or more computer-readable media of any of claims M-Q, wherein determining the exit point for the overlap area is further based on a safety distance added to the merge location.

S: The one or more computer-readable media of paragraph R, wherein the safety distance is based at least in part on a speed limit associated with the second lane.

T: The one or more computer-readable media of paragraph S, wherein the safety distance is further based on a time for the vehicle to reach the speed limit from a current speed.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions that, when executed by the one or more processors, perform operations comprising:
determining a junction in an environment based at least in part on map data, the junction comprising a first lane and a second lane;
determining that an autonomous vehicle is located in the first lane;
determining a first exit point associated with the second lane of the junction based at least in part on the map data;
determining a first trajectory for the autonomous vehicle to follow through the junction from the first lane into the second lane and passing through the first exit point;
detecting, based at least in part on sensor data, an object located in the second lane;

determining an overlap area comprising a first area of a possible overlap between the autonomous vehicle and the object and based at least in part on a second area associated with the first trajectory;

determining, based at least in part on detecting the object, a merge location at which a path of the first lane and a path of the second lane merge;

determining a second exit point associated with the overlap area based at least in part on the merge location;

determining a second trajectory for the autonomous vehicle based at least in part on the second exit point; and controlling the autonomous vehicle to follow the second trajectory.

2. The system of claim 1, wherein the second exit point for the overlap area reduces a size of the overlap area from the first exit point of the overlap area.

3. The system of claim 1, wherein the second exit point for the overlap area is further based on a safety distance added to the merge location.

4. The system of claim 3, wherein the safety distance is based at least in part on one or more of a speed limit associated with the second lane or a trajectory of the object.

5. A method of controlling an autonomous vehicle, the method comprising:

determining a junction in an environment, the junction comprising a first lane and a second lane;

detecting, based at least in part on sensor data associated with the autonomous vehicle, an object located in the second lane;

determining, responsive to detecting the object, a merge location at which a first path of the first lane and a second path of the second lane merge;

determining an exit point for an overlap area associated with the autonomous vehicle and the object based at least in part on the merge location;

determining a trajectory for the autonomous vehicle to enter the second lane based at least in part on the exit point; and controlling the autonomous vehicle to follow the trajectory.

6. The method of claim 5, wherein the trajectory is a first trajectory and the autonomous vehicle enters the second lane prior to the object entering the overlap area, the method further comprising:

detecting that the object enters a threshold distance of the autonomous vehicle in the overlap area; and determining a second trajectory for the object, the second trajectory responsive to the object entering the threshold distance and based at least in part on a prediction that the object will follow the autonomous vehicle in the second lane, wherein controlling the autonomous vehicle to follow the trajectory comprises preventing the autonomous vehicle from yielding to the object based at least in part on the second trajectory for the object.

7. The method of claim 5, wherein the trajectory for the autonomous vehicle to enter the second lane comprises a turn action or a merge action.

8. The method of claim 5, wherein the first path substantially follows a first center line of the first lane and the second path substantially follows a second center line of the second lane.

9. The method of claim 5, further comprising:

determining a size of the junction from map data; and determining first dimensions of the overlap area based at least in part on the size of the junction, wherein determining the exit point for the overlap area comprises determining second dimensions of the overlap area, the second dimensions being smaller than the first dimensions.

10. The method of claim 5, wherein determining the exit point for the overlap area is further based on a safety distance added to the merge location.

11. The method of claim 10, wherein the safety distance is based at least in part on a speed limit associated with the second lane or a trajectory of the object.

12. The method of claim 11, wherein the safety distance is further based on a time for the autonomous vehicle to reach the speed limit from a current speed.

13. One or more non-transitory computer-readable media storing instructions that, when executed by one or more processors, perform operations comprising:

determining a junction in an environment, the junction comprising a first lane and a second lane;

determining a vehicle trajectory for an autonomous vehicle to enter the second lane from the first lane and into the second lane;

detecting, based at least in part on sensor data associated with the autonomous vehicle, an object located in the second lane;

determining an object trajectory associated with the object;

determining a merge location at which a first path of the first lane and a second path of the second lane merge;

determining an overlap area between an area associated with the vehicle trajectory and the object trajectory;

determining an exit point for the overlap area based at least in part on the merge location;

altering, as an adjusted vehicle trajectory and based at least in part on the exit point, the vehicle trajectory; and controlling the autonomous vehicle to follow the adjusted vehicle trajectory.

14. The one or more non-transitory computer-readable media of claim 13, wherein the operations further comprise:

detecting that the object enters a threshold distance of the autonomous vehicle in the overlap area; and determining a second object trajectory for the object responsive to the object entering the threshold distance and based at least in part on a prediction that the object will follow the autonomous vehicle in the second lane, wherein controlling the autonomous vehicle to follow the adjusted vehicle trajectory comprises preventing the autonomous vehicle from yielding to the object based at least in part on the second object trajectory for the object.

15. The one or more non-transitory computer-readable media of claim 13, wherein the vehicle trajectory for the autonomous vehicle to enter the second lane comprises a turn action or a merge action.

16. The one or more non-transitory computer-readable media of claim 13, wherein the first path substantially follows a first center line of the first lane and the second path substantially follows a second center line of the second lane.

17. The one or more non-transitory computer-readable media of claim 13, the operations further comprising:

determining a size of the junction from map data; and determining first dimensions of the overlap area based at least in part on the size of the junction, wherein determining the exit point for the overlap area comprises determining second dimensions of the overlap area, the second dimensions being smaller than the first dimensions.

18. The one or more non-transitory computer-readable media of claim 13, wherein determining the exit point for the overlap area is further based on a safety distance added to the merge location.

19. The one or more non-transitory computer-readable media of claim 18, wherein the safety distance is based at least in part on a speed limit associated with the second lane.

20. The one or more non-transitory computer-readable media of claim 19, wherein the safety distance is further based on a time for the autonomous vehicle to reach the speed limit from a current speed.

* * * * *